2,765,272
PREPARATION OF BENZENE HEXACHLORIDE

Joseph A. Neubauer, Pittsburgh, Pa., and Franklin Strain, Barberton, and Frederick E. Kung and William E. Bissinger, Akron, Ohio, assignors to Columbia-Southern Chemical Corporation, Allegheny County, Pa., a corporation of Delaware No Drawing. Application July 25, 1952,
Serial No. 300,986

4 Claims. (Cl. 204—163)

This invention relates to a novel method of promoting the addition chlorination of benzene in the preparation of benzene hexachloride and it is of particular utility in providing a method of minimizing the fluctuations in the reaction rate as the reaction proceeds. It is of particular significance in promoting addition chlorination of benzene in connection with processes wherein constant reaction rates provide particular advantages, for example, in processes requiring control of chlorine concentrations.

It is known that benzene hexachloride may be prepared by reaction of benzene with chlorine in the absence of a chlorination substitution catalyst such as ferric or aluminum chloride. This reaction may be facilitated by actinic light, that is, light usually about 2500 to 4500 A. in wave length, or at least above the visible range in frequency, which produces chemical change.

At least five isomeric forms of benzene hexachloride are produced by conventional methods of addition chlorination of benzene. These isomers have been designated alpha, beta, delta, gamma and epsilon. For certain purposes, for example, the insecticidal field, it is conventionally recognized that high gamma isomer content is desirable.

Resort to the various addition chlorination of benzene methods described in the literature has resulted in production of products containing, at most, from 11 to 16 percent by weight of the gamma isomer. By recourse to this invention, it is possible consistently to obtain gamma contents in excess of 19 percent, with gamma contents above 20 percent attainable when optimum conditions are employed. Thus, practice of this invention insures at least a 15 percent increase, and provides, under ideal conditions, increases of 50 percent or more, over the maximum gamma isomer content attainable by conventional processes.

Addition chlorination of benzene may be effected by reacting gaseous or liquid chlorine with benzene while irradiating with actinic light. At temperatures from about 10° C. to 80° C., this reaction is carried out by adding gaseous chlorine to liquid benzene. Below the freezing point of benzene, 5° C., one method involves adding liquid benzene to liquid chlorine. Another low temperature process which may be carried out at temperatures as low as minus 60° or minus 80° C., involves adding liquid or gaseous chlorine to a liquid mixture of benzene and a benzene solvent. Suitable solvents include carbon tetrachloride, dichlorodifluoro methane and various others hereinafter described.

If gamma isomer contents in excess of the amounts obtainable by conventional addition chlorination process are to be achieved, it is essential to control the chlorine concentration in the reaction mixture. Chlorine concentration of from about 0.001 to 2.0 percent by weight of unreacted benzene and solvent, if the latter is used, may be employed. Preferably, concentrations from 0.005 to 1.5 percent are used.

Even higher gamma isomer contents may be attained by adding chlorine, as a gas or liquid, to a liquid mixture of benzene and a solvent selected from a particular class of liquid aliphatic partially halogenated hydrocarbons. Gamma yields in excess of 20 percent and as high as 28 percent may be achieved by adding chlorine to a liquid mixture of benzene and such solvent while maintaining the chlorine concentration between 0.001 and 1.5 percent by weight of the unreacted benzene and solvent and controlling the reaction temperature below 6° C. to as low as minus 80° C., or minus 100° C. Partially halogenated hydrocarbons such as methyl chloride, methylene chloride, chloroform, ethylene dichloride and methyl chloroform exemplify suitable solvents for such process. Other compounds such as trichloroethane, tertiary butyl chloride, secondary butyl chloride, isopropyl chloride, isobutyl chloride, n-propyl chloride, 1,1,2,2,3-pentachloropropane higher butane halides containing up to 4 (and including) carbon atoms, and analogous bromides, iodides or fluorides likewise are suitable solvents.

Chlorine concentration in the reaction mixture is a function of the reaction rate and chlorine addition rate. Control of this concentration, for example, may be achieved by establishing an initial concentration within the mixture and then balancing the chlorine input against the chlorine that reacts with the benzene. Chlorine is fed into the reaction mixture until the desired concentration is attained, preferably with the source of actinic light inoperative, and then with the source operating, chlorine is added in amounts equal to that which has reacted. In practice of such control, the light source is calibrated to determine its catalytic effect and chlorine is added in accordance with the results of such calibration.

The catalytic effect of an actinic light source is dependent on the particular type of light rays it emits, its voltage, its exact disposition with respect to the reaction mixture and the particular reaction mixture. Thus, for reproductibility, a given lamp operating at a fixed voltage must be located in a fixed position for a selected reaction mixture. Different results will attain when the source is moved, or, for instance, if a larger amount of reaction mixture is used.

In practice, therefore, a selected light source is disposed in one place with respect to the reaction mixture as the process is carried out. In one technique, the source is disposed in a transparent well within the reaction mixture, for instance, at the geometric center of the mixture. Another expedient involves disposing the source outside of the reaction mixture at a preselected distance therefrom. In either case, the source is stationary.

The problem of chlorine concentration control when these processes are carried out, is complicated by the fact that for a given source of actinic light the rate of formation of benzene hexachloride diminishes as the reaction proceed. Consequently, unless the rate of chlorine introduction is decreased and/or the intensity of the actinic irradiation is increased, the concentration of chlorine in the reaction mixture increases and builds up to a level which is outside of the range for optimum gamma concentration. This is especially true when the reaction is conducted at a temperature below 5° C.

This decreasing rate of reaction which occurs when actinic light is employed to promote the reaction has certain disadvantages. For example, it prolongs the time required to prepare a given amount of product. Thus, more equipment per ton of product is needed. It also imposes low conversions in commercial operations which in turn increases the cost of recovering for recycling unreacted reagents such as benzene. Increasing the intensity of actinic irradiation to compensate for the decreasing reaction rate makes refrigeration of the reaction mixture more difficult, particularly when the reaction is conducted at low temperatures, as below 5° C.

This invention avoids substantially the above disadvantages attendant to photochlorination of benzene. It provides a means for minimizing fluctuations in the reaction rate in direct contrast to photochlorination processes wherein the rate of reaction decreases steadily as the reaction proceeds. Consequently, more product per unit of equipment in a given reaction period may be prepared by recourse to this invention. Likewise, conversion of much larger percentages of the available benzene to benzene hexachloride is made more practical obviating recovery and recycling large amounts of unreacted benzene.

Practice of this invention involves preparing benzene hexachloride by reacting benzene and chlorine in the presence of catalytic amounts of a peroxydicarbonate ester or other organic peroxide catalyst and actinic irradiation. Various procedures may be employed in carrying out the invention.

One such procedure includes establishing a liquid reaction mixture containing benzene and a small catalytic percentage of a peroxydicarbonate ester or other peroxide catalyst, for instance, from 0.1 to 3 percent of the ester by weight of the reaction mixture and irradiating the mixture with actinic light while maintaining the reaction mixture liquid and below the freezing point of benzene.

Another embodiment includes adding gaseous or liquid chlorine, after establishing a predetermined chlorine content (preferably between 0.001 and 2.0 percent by weight of the benzene and solvent), to a liquid reaction mixture of benzene, a peroxydicarbonate ester in hereinafter described amounts, and a suitable solvent for benzene at temperatures below the freezing point of benzene and as low as minus 80° C. or even minus 100° C., the particular reaction temperature depending on the solvent, while irradiating the reaction mixture with actinic light.

Solvents that may be employed should be resistant to chlorination. That is, a proper solvent should not chlorinate at all under the reaction conditions, or if it does chlorinate, it should chlorinate only to a minor degree or produce a chlorinated product which is recoverable or marketable. Accordingly, the solvent need not necessarily be inert as to chlorine.

Typical solvents capable of use include the fluorochloromethanes such as dichlorodifluoromethane, trichlorotrifluoroethane, trichloromonofluoromethane and higher fully fluorinated and chlorinated hydrocarbons containing only chlorine, fluorine and carbon atoms. Other solvents include carbon tetrachloride, carbon tetrafluoride, and like fully halogenated hydrocarbons which are liquids at the temperature of reaction. Other liquids such as liquid sulphur dioxide, liquid sulphuryl chloride, liquid phosgene, kerosene, thionyl chloride, proprionic anhydride and like liquids are useful, regardless of the occurrence of some chlorination of the solvent. Furthermore, when particularly high gamma isomer concentrations are desired, partially halogenated hydrocarbons of from 1 to 4 carbon atoms, as hereinbefore described, should be employed as the solvent.

As will be apparent from the foregoing discussion, the coordinated use of actinic irradiation and organic peroxide catalysts is of particular import in processes wherein accurate control of the chlorine concentration in the reaction mixture is desirable. Likewise, it provides particular advantages when employed in processes which are performed at reaction temperatures below the freezing point of benzene. Thus, this means of promoting addition chlorination has particular significance in processes which require that the chlorine concentration be maintained within a particular range, such as between 0.001 and 2 percent by weight of the mixture, and/or are carried out at reaction temperatures below 5° C.

Another procedure involves performing any of the aforedescribed processes by irradiating the reaction mixture during the first portion of the reaction period. For instance, the light source may be rendered inoperative after a given portion of the benzene has reacted, for example, when 15 or 18 percent by weight of the benzene has been converted to benzene hexachloride.

It is also possible to commence the reaction by irradiating the reaction mixture with actinic light and then, after the reaction has proceeded, add the peroxydicarbonate ester to the reaction mixture. By selecting an appropriate amount of the ester, it is possible to continue or discontinue irradiation after the addition of the ester.

The peroxydicarbonate esters contemplated in connection with this process are compounds having the probable structure:

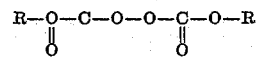

where R is an organic radical derived from an alcohol and linked to the oxygen atoms through carbon. These esters may be produced by reaction of sodium peroxide with a chloroformate in aqueous media, usually at 0 to 10° C. The esters may be regarded as esters of the theoretical peroxydicarbonic acid having the theoretical structure:

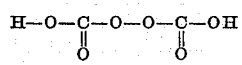

These esters normally are liquids or white solids which are soluble in organic solvents such as methyl or ethyl alcohol and which in many cases decompose at relatively low temperatures, below about 60° C. Further details concerning the properties of the peroxydicarbonates herein contemplated are given in U. S. Letters Patent 2,370,588, granted to Franklin Strain, February 27, 1945.

Peroxydicarbonate esters of various alcohols or hydroxy compounds which contain up to ten carbon atoms have been found to be successful. For example, the peroxydicarbonates of aliphatic monohydric alcohols such as methyl, ethyl, propyl, isopropyl, butyl, isobutyl, amyl, hexyl, allyl, methallyl, crotyl, dimethallyl, methyl vinyl carbinyl, linallyl, cinnamyl and 2-ethyl hexyl alcohol have been found suitable. Peroxydicarbonate esters of halo-alcohols, such as 2-chloro ethanol, 2-chloroallyl alcohol, propylene chlorohydrin, glycerol dichlorohydrin, etc., may be used. Esters of ethyl alcohols, such as 2-ethoxy ethyl alcohol, 2-n-butoxy ethyl alcohol, and similar ether alcohols are also suitable.

The amount of peroxydicarbonate ester which is necessary in order to catalyze this reaction is quite small. Even traces of the ester have been observed to have an advantageous effect. For purposes of this invention, a catalytic amount from about 0.1 to 4 percent by weight of peroxydicarbonate by weight of benzene and solvent, if the latter is present, is used. Even larger amounts, as high as 5 percent or more, may be used if they are necessary to maintain the chlorine concentration constant, for example, when low chlorine concentrations and high chlorine feed rates are to be maintained.

Certain other compounds function in the same manner as the aforedescribed peroxydicarbonate esters and may be employed in lieu of or in combination with the peroxydicarbonate esters in practice of this invention. Particular organic peroxides such as phenylacetyl peroxide and trichloroacetyl peroxide, for the purposes of this invention, are equivalent to the pereoxydicarbonate esters. It is to be recognized that not all peroxides are equivalents since many organic peroxides have little or no catalytic properties at temperatures below the freezing point of benzene. However, organic peroxides which per se catalyze the addition chlorination of benzene at temperatures below the freezing point of benzene are suitable and may be interchangeably substituted for peroxydicarbonate esters.

It is advantageous that certain precautions be exercised in the performance of this invention. The presence of oxygen or other impurities within the reaction is to be avoided. The benzene, chlorine and solvent are purified by suitable methods, such as distillation, with the ends being discarded. The reaction system is purged with nitrogen or other inert gas prior to introduction of chlorine, and generally the chlorine is introduced in the presence of nitrogen or other inert gas. Further, it is desirable that the reaction mixture be free from all substances which tend to promote substitution chlorination of benzene.

The following examples illustrate the practice of the invention but are not to be considered as imposing restrictions thereon:

Example I

A 1000 cubic centimeter, three-necked glass flask was fitted with a light well in place of one of the side necks, a stirrer bushing and gas outlet tube in the center neck, and a gas inlet tube and thermometer in the other side neck. A 100–200 R. P. M. nickel blade stirrer was disposed within the flask and in the bushing. A 6 watt GE filament bulb operable at 120 volts was placed near the geometric center of the flask by lowering it into the well.

The reactor was charged with 156 grams benzene, 758 grams methylene chloride, and 27.4 grams of isopropyl peroxydicarbonate and then purged by sweeping nitrogen at 0.2 moles per hour through the system for two hours while agitating at room temperature. The charge was then cooled to minus 15° C. by placing the reactor in a Dry Ice acetone bath and the light turned on. With the light source operating, 0.9 gram per minute of chlorine and 0.05 mole per hour of nitrogen were passed through the inlet tube into the reaction mixture for four hours. The temperature was maintained at minus 15° C. and the mixture was continuously agitated during the entire period.

Chlorine concentrations (see Table I hereinafter) were determined by removing a sample from the reaction mixture every thirty minutes during the course of the reaction and analyzing the sample. The product was recovered by distilling off the unreacted benzene and solvent and finally topping the mixture up to a liquid temperature of 140 to 150° C. at a pressure of 10 millimeters mercury for 10 minutes. Molten benzene hexachloride at 140° C. was flaked on a nickel sheet at 25° C., ground in a Stevens blender and analyzed by infrared for the various isomers. Two hundred and seventy grams of benzene hexachloride, representing a 92 percent yield, were recovered. The gamma isomer content was 21.3 percent by weight.

The following are chlorine concentrations observed during the course of the aforegoing experiment.

TABLE I

| Time of Sample Removal, Minutes after start of reaction | Chlorine Concentration, Percent by weight of Benzene and Methylene Chloride | Percent Conversion of Benzene |
|---|---|---|
| 30 | 0.50 | 6.5 |
| 60 | 0.39 | 12.5 |
| 90 | 0.34 | 19.0 |
| 120 | 0.31 | 25.5 |
| 150 | 0.295 | 32.0 |
| 180 | 0.285 | 38.0 |
| 210 | 0.295 | 44.5 |
| 240 | 0.31 | 50.7 |

Example II

Example I was duplicated except that isopropyl peroxydicarbonate was not employed. Only actinic light was used to catalyze the reaction. The chlorine concentrations at given intervals were as follows:

TABLE II

| Time of Sample Removal, Minutes after start of reaction | Chlorine Concentration, Percent by weight of Benzene and Methylene Chloride | Percent Conversion of Benzene |
|---|---|---|
| 30 | 0.90 | 6.5 |
| 60 | 0.77 | 12.5 |
| 90 | 0.81 | 19.0 |
| 120 | 0.86 | 25.5 |
| 150 | 1.015 | 32.0 |
| 180 | 1.135 | 38.0 |
| 210 | 1.365 | 44.5 |
| 240 | 1.5 | 50.7 |

Comparison of these experiments clearly shows the superiority of jointly employing actinic light and an appropriate organic peroxide to activate the reaction when relatively constant chlorine concentrations are desired.

Although the invention has been described with reference to specific details of certain embodiments, thereof, it is not intended that such details be regarded as limitations upon the scope of the invention, except insofar as included in the accompanying claims.

What is claimed:

1. A method of preparing benzene hexachloride which comprises introducing elemental chlorine into a liquid reaction mixture comprising benzene, maintaining the chlorine concentration in the mixture throughout substantially the entire reaction period in the range of 0.001 to 2 per cent by weight of the mixture, maintaining the temperature of the mixture below 5° C., irradiating the mixture with actinic light and minimizing fluctuations in the chlorine concentration within said range in the reaction mixture during the chlorine introduction by maintaining in the mixture a small catalytic concentration of an organic peroxide catalytically operative at the reaction temperature.

2. The method of claim 1 wherein the organic peroxide is a peroxydicarbonate ester.

3. The method of claim 1 wherein the organic peroxide constitutes from about 0.1 to about 5 per cent by weight of the reaction mixture.

4. The method of claim 1 wherein the organic peroxide is a peroxydicarbonate ester, the ester constituting from about 0.1 to about 3 per cent by weight of the reaction mixture.

References Cited in the file of this patent
FOREIGN PATENTS
277,206   Switzerland _____ Aug. 31, 1951

OTHER REFERENCES

Kharasch et al.: Journal Organic Chemistry, vol. 6 (1941), pp. 810–817.